United States Patent [19]
Katz

[11] Patent Number: 6,158,138
[45] Date of Patent: Dec. 12, 2000

[54] MEASURING TAPE PENCIL SHARPENER COMBINATION

[76] Inventor: David Katz, 317 N. Pines Rd., Blythewood, S.C. 29016

[21] Appl. No.: 09/146,557

[22] Filed: Sep. 3, 1998

[51] Int. Cl.[7] .................................................. G01B 3/10
[52] U.S. Cl. ................................ 33/760; 33/761; 33/768
[58] Field of Search .............................. 33/760, 755, 761, 33/768, 769, 770, 668; D10/71, 72

[56] References Cited

U.S. PATENT DOCUMENTS

| | | | |
|---|---|---|---|
| 1,986,551 | 1/1935 | Anderson | 33/769 |
| 2,207,277 | 7/1940 | Volz | 33/769 |
| 4,438,538 | 3/1984 | Larsen | 33/760 |
| 4,744,150 | 5/1988 | Horvath | 33/760 |
| 4,766,673 | 8/1988 | Bolson | 33/760 |
| 5,040,256 | 8/1991 | Mills | 33/760 |
| 5,379,524 | 1/1995 | Dawson | 33/760 |

Primary Examiner—Christopher W. Fulton

[57] ABSTRACT

A measuring tape pencil sharpener combination is provided including a housing. A measuring tape is coiled within an interior space of the housing with a free end extending from the housing. A lid defines a compartment and is pivotally coupled to the housing and has a closed orientation in abutment with the housing and an open orientation for allowing access within the compartment. A pencil sharpener is provided for sharpening a pencil and depositing shavings within the compartment of the lid.

8 Claims, 2 Drawing Sheets

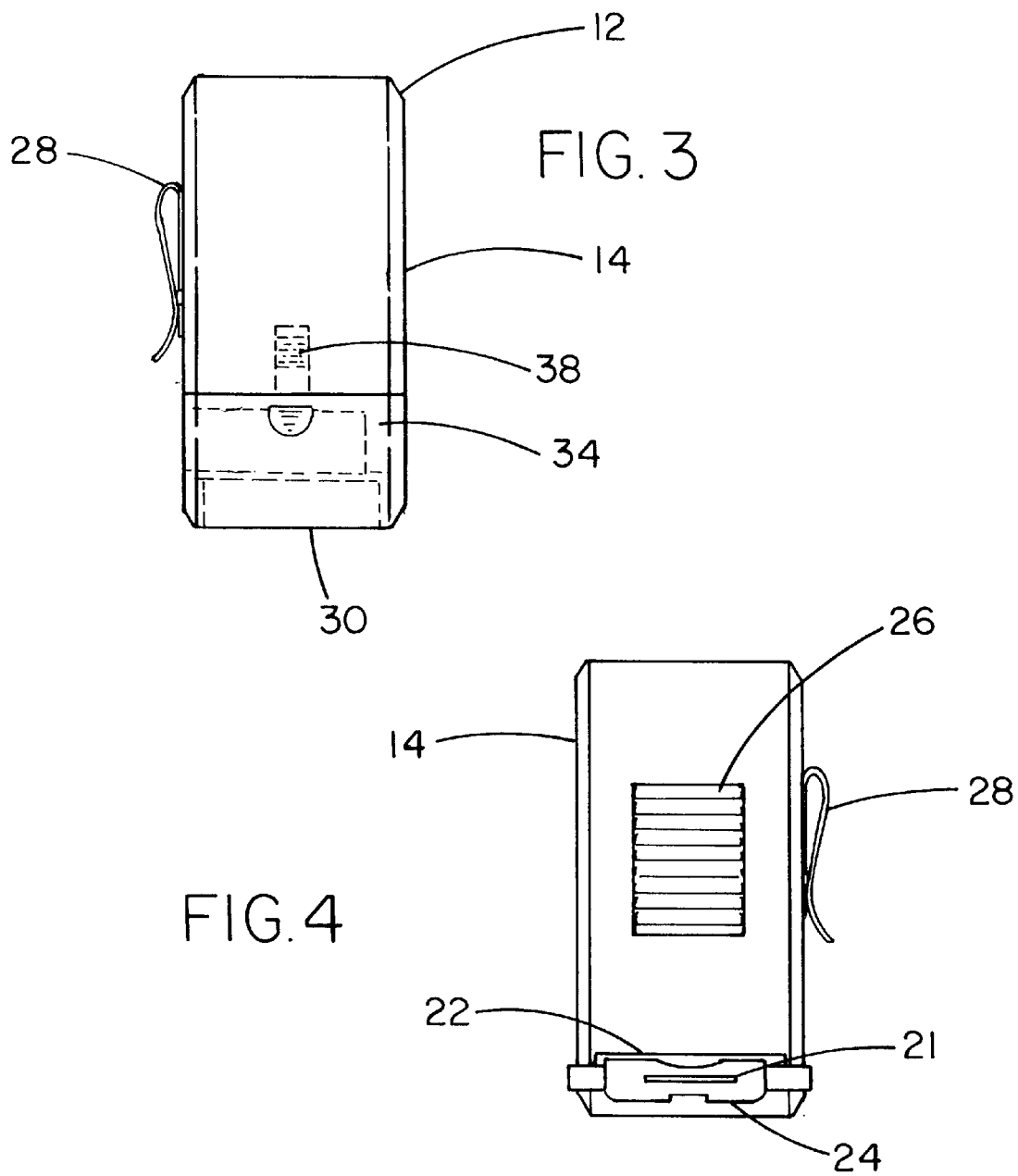

MEASURING TAPE PENCIL SHARPENER COMBINATION

BACKGROUND OF THE INVENTION

1. Field of the Invention

The present invention relates to measuring tapes and more particularly pertains to a new measuring tape pencil sharpener combination for conveniently dispensing of shavings from sharpening a pencil within a sharpener mounted on a measuring tape.

2. Description of the Prior Art

The use of measuring tapes is known in the prior art. More specifically, measuring tapes heretofore devised and utilized are known to consist basically of familiar, expected and obvious structural configurations, notwithstanding the myriad of designs encompassed by the crowded prior art which have been developed for the fulfillment of countless objectives and requirements.

Known prior art measuring tapes include U.S. Pat. No. 5,040,256; U.S. Pat. No. 4,744,150; U.S. Pat. Des. 339,536; U.S. Pat. Des. 341,545; U.S. Pat. No. 4,766,673; and U.S. Pat. Des. 324,184.

In these respects, the measuring tape pencil sharpener combination according to the present invention substantially departs from the conventional concepts and designs of the prior art, and in so doing provides an apparatus primarily developed for the purpose of conveniently dispensing of shavings from sharpening a pencil within a sharpener mounted on a measuring tape.

SUMMARY OF THE INVENTION

In view of the foregoing disadvantages inherent in the known types of measuring tapes now present in the prior art, the present invention provides a new measuring tape pencil sharpener combination construction wherein the same can be utilized for conveniently dispensing of shavings from sharpening a pencil within a sharpener mounted on a measuring tape.

The general purpose of the present invention, which will be described subsequently in greater detail, is to provide a new measuring tape pencil sharpener combination apparatus and method which has many of the advantages of the measuring tapes mentioned heretofore and many novel features that result in a new measuring tape pencil sharpener combination which is not anticipated, rendered obvious, suggested, or even implied by any of the prior art measuring tapes, either alone or in any combination thereof.

To attain this, the present invention generally comprises a housing having a generally disk-shaped configuration including a pair of side faces with a periphery integrally coupled therebetween thus forming an interior space. The periphery is defined by a semicircular arcuate portion, a linear beveled portion and a linear bottom portion. Also included is a measuring tape coiled within the interior space of the housing with a free end extending from a rectangular slot. Such slot is situated at the interconnection of the arcuate portion and the linear bottom portion of the housing. A gripping tab is mounted on the measuring tape with an L-shaped cross-section. The measuring tape has a biased extended orientation for measuring purposes and an unbiased retracted orientation for storage purposes. Next provided is a locking tab slidably mounted to the arcuate portion of the housing. The tab has a first orientation for fixing the tape with respect to the rectangular slot and a second orientation for allowing the tape to slide freely between the extended and retracted orientation. Also included is a clip having a generally inverted U-shaped configuration with a first side arm mounted on one of the side faces of the housing. A second side arm may be clipped to an article of clothing of a user. As best shown in FIGS. 1 & 2, a lid is included which defines a compartment. The lid includes a bottom rectangular face having an inboard end pivotally coupled to the interconnection between the arcuate portion and linear bottom portion of the housing. An end face is coupled to an outboard end of the bottom rectangular face of the lid and extends upwardly therefrom. A pair of triangular side faces are coupled between the bottom rectangular face and end face of the lid. The lid has a closed orientation in abutment with the linear bottom portion of the housing and an open orientation for allowing access within the compartment. Finally, a pencil sharpener is defined by a conical inset portion formed in one of the side faces of the lid. The inset portion has a portion thereof cut out for allowing communication with the compartment. A blade is mounted in the inset portion for sharpening a pencil upon the placement of a tip thereof within the sharpener and the subsequent rotation thereof. As such, shavings pass through the cut out of the inset portion and into the compartment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new measuring tape pencil sharpener combination apparatus and method which has many of the advantages of the measuring tapes mentioned heretofore and many novel features that result in a new measuring tape pencil sharpener combination which is not anticipated, rendered obvious, suggested, or even implied by any of the prior art measuring tapes, either alone or in any combination thereof.

It is another object of the present invention to provide a new measuring tape pencil sharpener combination which may be easily and efficiently manufactured and marketed.

It is a further object of the present invention to provide a new measuring tape pencil sharpener combination which is of a durable and reliable construction.

An even further object of the present invention is to provide a new measuring tape pencil sharpener combination which is susceptible of a low cost of manufacture with regard to both materials and labor, and which accordingly is then susceptible of low prices of sale to the consuming public, thereby making such measuring tape pencil sharpener combination economically available to the buying public.

Still yet another object of the present invention is to provide a new measuring tape pencil sharpener combination which provides in the apparatuses and methods of the prior art some of the advantages thereof, while simultaneously overcoming some of the disadvantages normally associated therewith.

Still another object of the present invention is to provide a new measuring tape pencil sharpener combination for allowing the convenient dispensing of shavings from sharpening a pencil within a sharpener mounted on a measuring tape.

Even still another object of the present invention is to provide a new measuring tape pencil sharpener combination that includes a housing. A measuring tape is coiled within an interior space of the housing with a free end extending from the housing. A lid defines a compartment and is pivotally coupled to the housing and has a closed orientation in abutment with the housing and an open orientation for allowing access within the compartment. A pencil sharpener is provided for sharpening a pencil and depositing shavings within the compartment of the lid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of the present invention.

FIG. 4 is a rear view of the present invention.

DESCRIPTION OF THE PREFERRED EMBODIMENT

Figure 1:
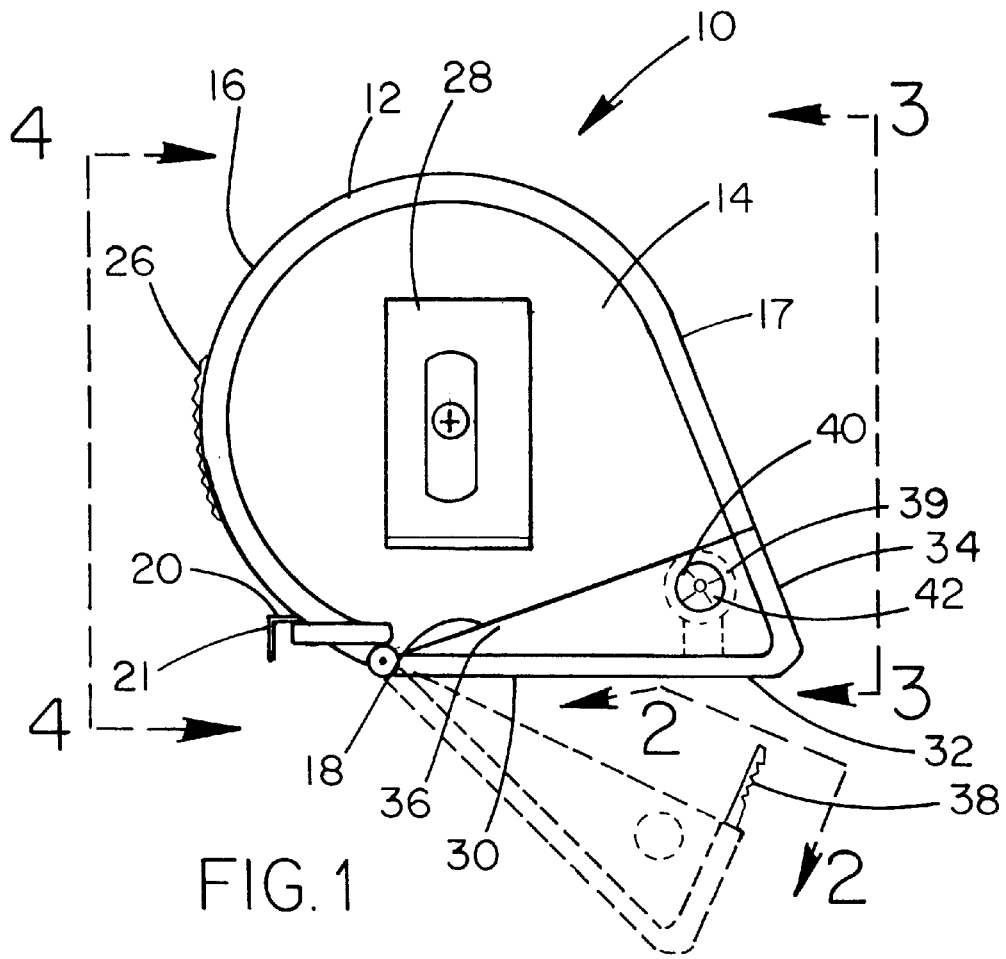
FIG. 1 is a side view of a new measuring tape pencil sharpener combination according to the present invention.

With reference now to the drawings, and in particular to FIGS. 1 through 4 thereof, a new measuring tape pencil sharpener combination embodying the principles and concepts of the present invention and generally designated by the reference numeral 10 will be described.

The present invention, as designated as numeral 10, includes a housing 12 having a generally disk-shaped configuration including a pair of side faces 14 with a periphery integrally coupled therebetween thus forming an interior space. The periphery is defined by a semicircular arcuate portion 16, a linear beveled portion 17 and a linear bottom portion 18. The beveled and bottom portions are of an equal length and form a right angle.

Also included is a measuring tape 20 coiled within the interior space of the housing with a free end 21 extending from a rectangular slot 22. Such slot is situated at the interconnection of the arcuate portion and the linear bottom portion of the housing. A gripping tab 24 is mounted on the measuring tape with an L-shaped cross-section. The measuring tape has a biased extended orientation for measuring purposes and an unbiased retracted orientation for storage purposes.

Next provided is a locking tab 26 slidably mounted to the arcuate portion of the housing. The tab has a first orientation for fixing the tape with respect to the rectangular slot and a second orientation for allowing the tape to slide freely between the extended and retracted orientation. The internal components for effecting the proper operation of the locking tab is commonly known in the art.

Also included is a clip 28 having a generally inverted U-shaped configuration with a first side arm screwably mounted on one of the side faces of the housing. A second side arm is resiliently and integrally coupled to the first arm and may be clipped to an article of clothing.

Figure 2:
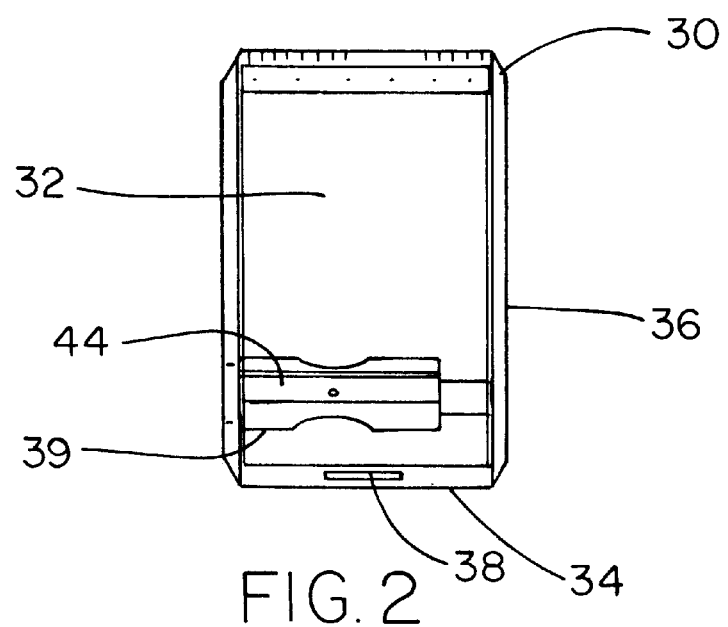
FIG. 2 is a top view of the container of the present invention.

As best shown in FIGS. 1 & 2, a transparent lid 30 is included which defines a compartment. The lid includes a bottom rectangular face 32 having an inboard end pivotally coupled to the interconnection between the arcuate portion and linear bottom portion of the housing. An end face 34 is coupled to an outboard end of the bottom rectangular face of the lid and extends upwardly therefrom. A pair of triangular side faces 36 are coupled between the bottom rectangular face and end face of the lid.

During use, the lid has a closed orientation in abutment with the linear bottom portion of the housing and an open orientation for allowing access within the compartment. In the closed orientation, the end face of the compartment is in coplanar relationship with the beveled portion of the housing. It should be noted that the lid may further be removably coupled to the housing.

In the preferred embodiment, the end face of the lid has a semi-flexible resilient tab 38 ending therefrom in coplanar relationship therewith. A plurality of ridges are formed in the end of such tab. Associated therewith is a slot formed in the beveled face of the housing for releasably receiving the tab. Ideally, the slot is lined with complementary edges for securing to those of the tab.

Finally, a pencil sharpener 39 is defined by a conical inset portion 40 coupled between the side faces of the lid adjacent to the end face. The inset portion has a portion thereof cut out 42 for allowing communication with the compartment. A blade 44 is mounted in the inset portion for sharpening a pencil upon the placement of a tip thereof within the sharpener and the subsequent rotation thereof. As such, shavings pass through the cut out of the inset portion and into the compartment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A measuring tape pencil sharpener combination comprising:
 - a housing having a generally disk-shaped configuration including a pair of side faces with a periphery integrally coupled therebetween thus forming an interior space, the periphery defined by a semicircular arcuate portion, a linear beveled portion and a linear bottom portion;
 - a measuring tape coiled within the interior space of the housing with a free end extending from a rectangular slot at the interconnection of the arcuate portion and the linear bottom portion of the housing with a gripping tab mounted thereon having an L-shaped cross-section, whereby the measuring tape has a biased extended orientation for measuring purposes and an unbiased retracted orientation for storage purposes;
 - a locking tab slidably mounted to the arcuate portion of the housing with a first orientation for fixing the tape with respect to the rectangular slot and a second orientation for allowing the tape to slide freely between the extended and retracted orientation;
 - a clip having a generally inverted U-shaped configuration with a first side arm mounted on one of the side faces of the housing such that a second side arm may be clipped to an article of clothing of a user;
 - a lid defining a compartment with an interior, the compartment having an opening into the interior of the compartment, the opening having a size substantially as large as a largest dimension of the interior of the compartment, the lid including a bottom rectangular face having an inboard end pivotally coupled to the interconnection between the arcuate portion and linear bottom portion of the housing, an end face coupled to an outboard end of the bottom rectangular face of the lid and extending upwardly therefrom, and a pair of triangular side faces coupled between the bottom rectangular face and end face of the lid, the lid having a closed orientation characterized by the opening being positioned adjacent to the linear bottom portion of the housing and an open orientation characterized by the opening being positioned away from the housing for allowing access to the interior of the compartment; and
 - a pencil sharpener defined by a conical inset portion formed in one of the side faces of the lid, the inset portion having a portion thereof cut out for allowing communication with the compartment and a blade mounted therein for sharpening a pencil upon the placement of a tip thereof within the sharpener and the rotation thereof, whereby shavings pass through the cut out of the inset portion and into the interior of the compartment.

2. A measuring tape pencil sharpener combination comprising:
 - a housing;
 - a measuring tape coiled within an interior space of the housing with a free end extending from the housing;
 - a lid defining a compartment with an interior, the compartment having an opening into the interior of the compartment, the opening having a size substantially as large as a largest dimension of the interior of the compartment, the lid being pivotally coupled to the housing and having a closed orientation characterized by the opening being positioned adjacent to the housing and an open orientation characterized by the opening being positioned away from the housing for allowing access to the interior of the compartment; and
 - a pencil sharpener mounted on the lid for sharpening a pencil and depositing shavings within the compartment of the lid.

3. A measuring tape pencil sharpener combination as set forth in claim 2 wherein the pencil sharpener is defined by a conical inset portion formed in the lid, the inset portion having a portion thereof cut out for allowing communication with the compartment and a blade mounted therein for sharpening a pencil upon the placement of a tip thereof within the sharpener and the rotation thereof, whereby shavings pass through the cut out of the inset portion and into the interior of the compartment.

4. A measuring tape pencil sharpener combination as set forth in claim 2 wherein the housing has a generally disk-shaped configuration including a pair of side faces with a periphery integrally coupled therebetween thus forming the interior space of the housing, the periphery defined by a semicircular arcuate portion, a linear beveled portion and a linear bottom portion.

5. A measuring tape pencil sharpener combination as set forth in claim 2 wherein a gripping tab is mounted on the measuring tape having an L-shaped cross-section.

6. A measuring tape pencil sharpener combination as set forth in claim 2 wherein the measuring tape has a biased extended orientation for measuring purposes and an unbiased retracted orientation for storage purposes and further included is a locking tab slidably mounted to the housing with a first orientation for fixing the tape with respect to the housing and a second orientation for allowing the tape to slide freely between the extended and retracted orientation.

7. A measuring tape pencil sharpener combination as set forth in claim 2 and further included is a clip having a generally inverted U-shaped configuration with a first side arm mounted on one of the side faces of the housing such that a second side arm may be clipped to an article of clothing of a user.

8. A measuring tape pencil sharpener combination as set forth in claim 2 wherein the lid includes a bottom rectangular face having an inboard end pivotally coupled to the housing, an end face coupled to an outboard end of the bottom rectangular face of the lid and extending upwardly therefrom, and a pair of triangular side faces coupled between the bottom rectangular face and end face of the lid, the lid having a closed orientation in abutment with the housing and an open orientation for allowing access within the compartment.

* * * * *